United States Patent
Colvin

(10) Patent No.: US 10,538,600 B2
(45) Date of Patent: Jan. 21, 2020

(54) NATURAL RUBBER COMPOUNDS WITH SILICA AND USE WITH TIRES

(71) Applicant: COOPER TIRE & RUBBER COMPANY, Findlay, OH (US)

(72) Inventor: Howard A. Colvin, Wayne, OH (US)

(73) Assignee: COOPER TIRE AND RUBBER COMPANY, Findlay, OH (US)

(*) Notice: Subject to any disclaimer, the term of this patent is extended or adjusted under 35 U.S.C. 154(b) by 4 days.

(21) Appl. No.: 15/542,528

(22) PCT Filed: Jan. 12, 2016

(86) PCT No.: PCT/US2016/013043
§ 371 (c)(1),
(2) Date: Jul. 10, 2017

(87) PCT Pub. No.: WO2016/115132
PCT Pub. Date: Jul. 21, 2016

(65) Prior Publication Data
US 2018/0265601 A1 Sep. 20, 2018

Related U.S. Application Data

(60) Provisional application No. 62/102,211, filed on Jan. 12, 2015.

(51) Int. Cl.
| | | |
|---|---|---|
| C08C 19/25 | (2006.01) | |
| C08C 4/00 | (2006.01) | |
| C08K 9/00 | (2006.01) | |
| C08K 3/36 | (2006.01) | |
| C08K 3/04 | (2006.01) | |
| B60C 1/00 | (2006.01) | |

(52) U.S. Cl.
CPC ............ C08C 19/25 (2013.01); B60C 1/0016 (2013.01); C08C 4/00 (2013.01); C08K 3/04 (2013.01); C08K 3/36 (2013.01); C08K 9/00 (2013.01); *C08K 2201/006* (2013.01)

(58) Field of Classification Search
CPC .. C08C 19/25; C08C 4/00; C08K 9/00; C08K 3/36; C08K 3/04; B60C 1/00

USPC .......................................................... 523/152
See application file for complete search history.

(56) References Cited

U.S. PATENT DOCUMENTS

| | | |
|---|---|---|
| 7,594,528 B2 | 9/2009 | Sandstrom |
| 7,923,039 B2 | 4/2011 | Cornish |
| 8,865,799 B2 | 10/2014 | Wallen |
| 2006/0137575 A1 | 6/2006 | Stenzel |
| 2008/0015336 A1 | 1/2008 | Cornish |
| 2010/0022684 A1 | 1/2010 | Wallen |
| 2013/0203915 A1 | 8/2013 | Arigo |
| 2013/0203940 A1 | 8/2013 | Soto |
| 2013/0253088 A1* | 9/2013 | Agarwal ................. C08K 3/013 523/156 |
| 2014/0357803 A1* | 12/2014 | Mazumdar ............ C08F 136/08 525/332.3 |
| 2015/0159001 A1* | 6/2015 | Qu ............................ C08L 7/02 525/132 |

FOREIGN PATENT DOCUMENTS

| | | |
|---|---|---|
| CN | 103772760 A | 5/2014 |
| GB | 1400930 | 7/1975 |
| GB | 1438355 | 6/1976 |

OTHER PUBLICATIONS

Kaewsakul et al.; Optimization of Rubber Formulation for Silica-Reinforced Natural Rubber Compounds, Rubber Chemistry and Technology, vol. 86, No. 2, pp. 313-329.

* cited by examiner

*Primary Examiner* — Deve V Hall
(74) *Attorney, Agent, or Firm* — Fay Sharpe LLP

(57) ABSTRACT

A rubber composition including guayule rubber and 15 to 90 phr silica. The rubber can be cis-1,4 polyisoprene and include 15 to 90 phr silica and contain less than 20% of the proteins associated with *Hevea* rubber and further include at least a trace of resins present in other natural rubbers. The rubber can be cis-1,4 polyisoprene and further include between at least a trace and 3% by weight of resins present in guayule rubber. The rubber composition can further be comprised of a synthetic rubber and include between about 40-100 phr of guayule rubber, and silica. The silica can be hydrophobated.

14 Claims, 5 Drawing Sheets

Interactions – Tread Compounds – Mooney Viscosity

Interactions – Apex Compounds – Mooney Viscosity

Interactions – Sidewall Compounds – Mooney Viscosity

Interaction – All Stocks Combined – Mooney Viscosity

NATURAL RUBBER COMPOUNDS WITH SILICA AND USE WITH TIRES

BACKGROUND

The present exemplary embodiment relates to a method for producing a rubber including silica and natural rubber, and the rubber produced thereby. It finds particular application in conjunction with guayule rubber, and will be described with reference thereto. However, it is to be appreciated that the present exemplary embodiment is also amenable to other similar natural rubber materials. It finds particular suitability for use in association with tires and will be described in association therewith. However, it is to be appreciated that the present exemplary embodiments are also amenable to other applications, such as engineered product applications such as hoses and belts.

Natural rubber, derived from the plant *Hevea brasiliensis* is a core component of many consumer goods, including medical devices and tires. The United States has a strong reliance on natural rubber, primarily because synthetic alternatives cannot match the high performance properties of natural rubber required for many applications and tend to be expensive. *Hevea brasiliensis* rubber is a critical material for all types of tires but especially for heavy truck and aircraft tires. These types of tires have a very large percentage of natural rubber because of the low heat buildup of natural rubber based compounds. Similarly, passenger tires may advantageously include a significant amount of natural rubber in specific components such as sidewall and bead filler to provide low heat build-up and flex fatigue resistance.

Over 90% of the *Hevea*-derived natural rubber imported by the United States originates in Indonesia, Malaysia and Thailand. Natural rubber sources in these countries are under intense threat from potential diseases and blights due to the genetic similarity of the rubber plants. Furthermore, the crop is limited to a restricted geographic area and labor-intensive harvesting methods. In addition, the Southeast Asian natural rubber crop contains many protein contaminants which are responsible for Type-I latex allergies, which are estimated to affect as many as 20 million Americans. The high cost of importation to the United States, as well as the potential for the entire crop to be wiped out by disease and the ubiquity of latex allergies, make non-allergenic domestic natural rubber alternatives particularly attractive.

Accordingly, attention is being directed to the production of natural rubber from plants such as guayule (*Parthenium argentatum*) and Russian dandelion (*Taraxacum kok-saghyz*), which yield polymeric cis 1,4-isoprene essentially identical to that produced by *Hevea* rubber trees in Southeast Asia. A major difference between *Hevea* rubber (HR) and guayule rubber (GR) is in the amount and types of proteins contained in each species. *Hevea* rubber possesses many different types of proteins with a 14-kDa "rubber elongation factor" and a 24-kDa "small rubber particle protein" (SRPP) dominating. Both of these are known allergens. In guayule, there are few proteins. A 53-kDa monoxygenase P450 (an allene oxide synthase) comprises about 50% of the rubber particle protein. (See M. Whalen, C. McMahan and D. Shintani, "Development of Crops to Produce Industrially Useful Natural Rubber, Isoprenoid Synthesis in Plants and Microorganisms: New Concepts and Experimental Approaches, pages 329-345, T. Bach and M. Rohmer eds, 2013; the disclosure of which is herein incorporated by reference). Thus, although the chemical structure of the rubber in both species are similar (cis-1,4 polyisoprene), the overall composition of the rubbers is not the same. A comparison of three different types of rubber—*Hevea*, Guayule, and TSK "Dandelion rubber" is shown in the table below.

TABLE

| Protein sequences Function | Presence in rubber particles | | |
|---|---|---|---|
| | Hevea | Guayule | Russian dandelion |
| Rubber-associated | | | |
| Small rubber particle protein | + | − | + |
| Rubber elongation factor | + | − | + |
| Allene oxide synthase | − | + | + |
| Defense- or stress-related | | | |
| Lipoxygenase, chitinase, PGase inhibitor | − | + | + |
| Proteases, protease inhibitors | − | + | + |
| Phospholipase C, lipases, peroxidase, acid phosphatase | + | − | + |
| Dehydration-, wound-, stress-inducible proteins | + | − | − |
| Annexin | + | − | + |
| Endomembrane-associated | + | + | + |
| Mitochondria-associated | − | + | + |

The use of silica as a filler in tire rubbers has grown tremendously since its introduction into main line tires in the early 1990's. It has particularly been used in association with synthetic styrene-butadiene and polybutadiene rubbers. This is due to up to a 30% reduction in rolling resistance and up to a 15% increase in wet adhesion in poor weather conditions when a silica filler is used instead of carbon black. To achieve these advantages, it is beneficial to react the silica with a silane coupling agent either before it is mixed into the rubber (an ex-situ process) or during the mixing of the rubber with the silica (in-situ process). Almost all commercial tire compounds using silica use the in-situ process for preparation of silica compounds.

The in-situ silica/silane technology has not been widely adopted in natural rubber compounds due to problems with rolling resistance, wear, handling and tear strength. This may be due to the presence of non-rubber materials in the natural rubber not present in the styrene-butadiene or polybutadiene rubber used in passenger tires. It may also be that these materials, especially the proteins and protein metabolites, may interfere with the silanization reaction to reduce overall physical properties and adversely affect processing. Investigators have tried to overcome these shortcomings by using pretreated (ex-situ) silica such as the Agilon family of products (see Justin Martin and Timothy Okel—"Bringing innovation to the surface: Functionalized slicas for improved natural rubber truck tire vulcanizates"—Technical paper at 184th Rubber Division meeting Oct. 8, 2013) in natural rubber compounds, but this is an extremely costly solution. There remains a need to be able to improve the incorporation of silica/silane into natural rubber compounds using conventional in-situ silica mixing technology.

Processing of rubber components is an important part of making tires. Ideally, very high molecular weight polymers incorporating various functional groups could be used in compounds to achieve maximum performance, but in many cases it is difficult to mix these types of materials. There is always a tradeoff between tire performance and the ability to mix the desired ingredients. There are several ways to measure the processability of compounds. One of the more common techniques is to measure the compounds Mooney viscosity. For the most part, the lower the compound Mooney viscosity, the better the processability. A less common approach, but one that can be applied to more tire building operations is capillary rheometery. In this test, a rubber sample is subjected to various shear rates, and a plot of polymer viscosity versus shear rates is obtained. Since different plant operations operate at different shear rates, the plots generated from the capillary rheometer can be used to predict performance for all of the plant operations, including extrusion, mixing and calendaring.

BRIEF DESCRIPTION

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

According to a first embodiment, a rubber composition including guayule rubber and 15 to 90 phr silica is disclosed. The rubber can be cis-1,4 polyisoprene and include 15 to 90 phr silica and contain less than 20% of the proteins associated with *Hevea* rubber and further include at least a trace of resins present in other natural rubbers. In certain embodiments the *Hevea* protein content can be less than 5% or even less than 2%. The rubber can be cis-1,4 polyisoprene and further including between at least a trace and 3% by weight of resins present in guayule rubber. The rubber composition can further be comprised of a synthetic rubber and include between about 40-100 phr of guayule rubber, and silica. The silica can be hydophobated.

DETAILED DESCRIPTION

In the description of this invention, the terms "compounded" rubber compositions and "compounds" where used refer to the respective rubber compositions which have been compounded with appropriate compounding ingredients such as, for example, carbon black, oil, stearic acid, zinc oxide, silica, wax, anti-degradants, resin(s), sulfur accelerator(s), and silica coupler where appropriate. The terms "rubber" and "elastomer" may be used interchangeably. The amounts of materials are usually expressed in parts of material per 100 parts of rubber polymer by weight (phr).

The processing of plants for the extraction of biopolymers such as natural rubber latex can be achieved using chemical and/or mechanical processing. The methods utilized typically follow the general steps of: pre-grinding, wet milling, filtration, clarification, separation of liquid phases, purification, creaming, and concentration. Exemplary harvesting/processing techniques are described in U.S. Pat. No. 7,923,039 and US Patent Publication 2008/0015336, the disclosures of which are herein incorporated by reference.

Non-limiting examples of plant materials that can be used include, but are not limited to, guayule plant (*Parthenium argentatum*), gopher plant (*Euphorbia lathyris*), mariola (*Parthenium incanum*), rabbitbrush (*Chrysothamnus nauseosus*), milkweeds (*Asclepias* L.), goldenrods (*Solidago*), pale Indian plantain (*Cacalia atripilcifolia*), rubber vine (*Crypstogeia grandiflora*), Russian dandelions (*Taraxacum kok-saghyz*), mountain mint (*Pycnanthemum incanum*), American germander (*Teucreum canadense*) and tall bellflower (*Campanula americana*).

In practice, pneumatic rubber tires conventionally have relatively thin rubber sidewalls, a relatively thicker rubber tread, and a rubber inclusive bead, which are normally expected to be able to be subject to significant punishment under typically operating conditions by undergoing considerable dynamic distortion and flexing, abrasion due to scuffing, fatigue cracking and weathering such as, for example, atmospheric ozone aging. The rubber compounds of this disclosure are suitable for each of these applications.

Figure 1:
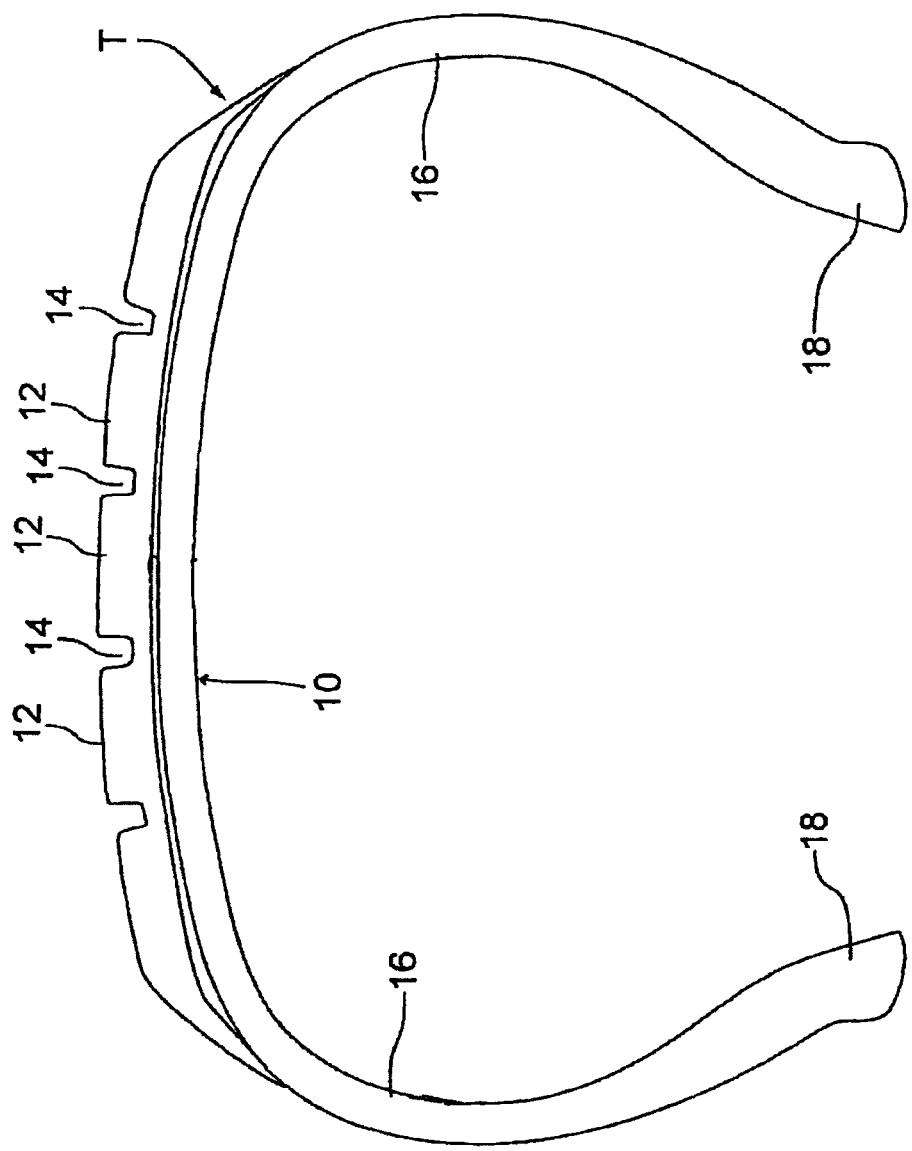
FIG. 1 illustrates a tire in cross-section suitable for construction using the rubber compounds of this disclosure.
Figure 2:
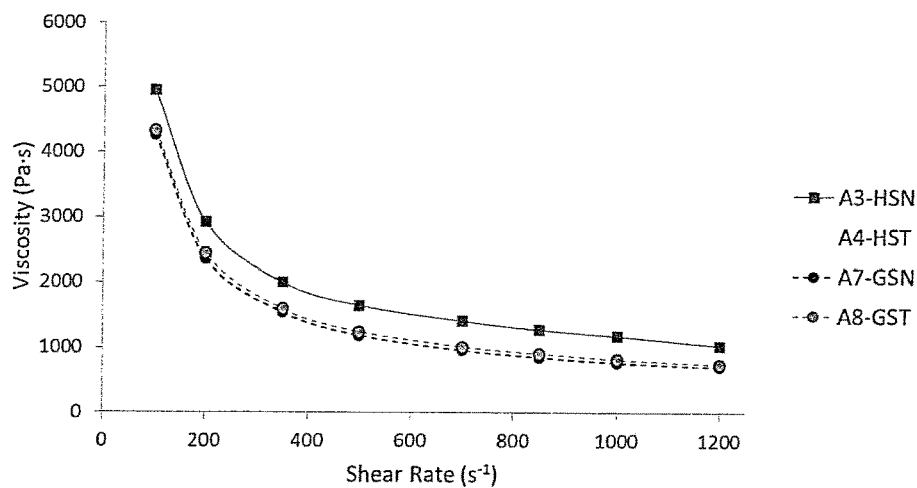
FIG. 2 graphically illustrates the effect of oil type on viscosity for silica tread compounds (100 phr R) demonstrating lower viscosity for guayule compounds and a higher effect of oil on *Hevea* compounds.
Figure 3:
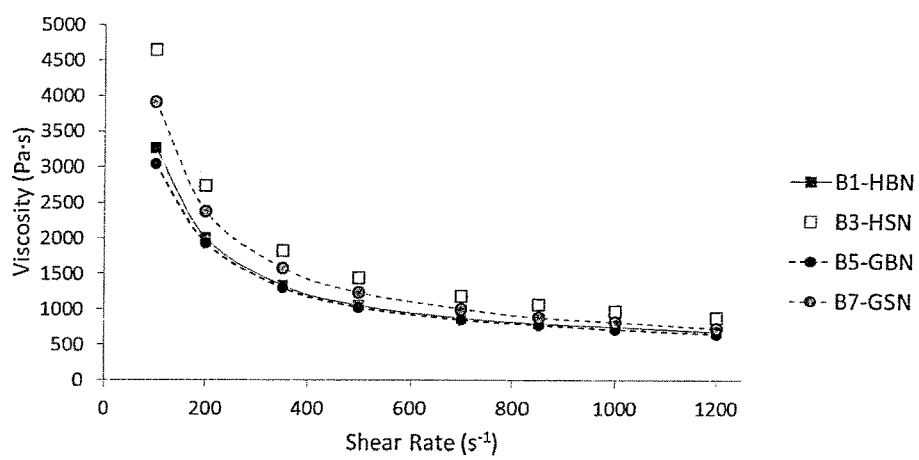
FIG. 3 graphically illustrates the effect of filler type on viscosity in sidewall compounds (40 phr R) showing guayule and *Hevea* black compounds had similar viscosities, black compounds had lower viscosity than silica compounds, and guayule silica compounds had lower viscosity than *Hevea* silica compounds.
Figure 4:
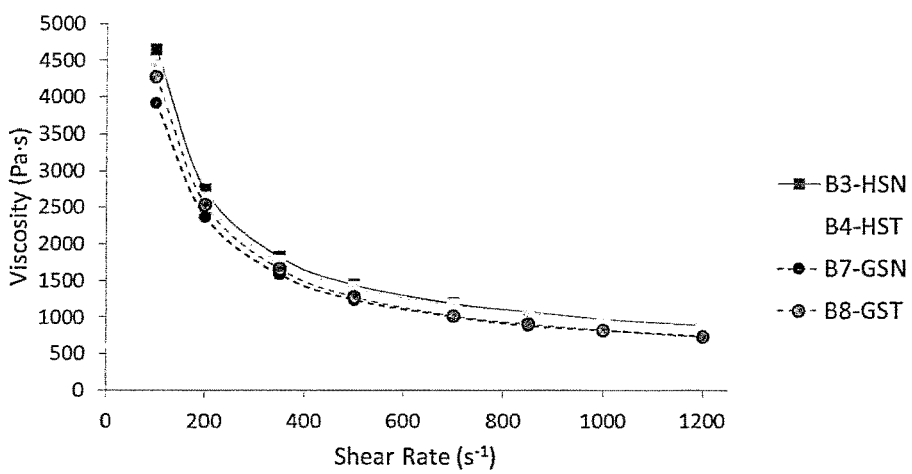
FIG. 4 graphically illustrates the effect of oil type on viscosity in silica containing sidewall compounds (40 phr R) demonstrating that a lower level of natural rubber in a recipe leads to smaller viscosity differences, guayule compounds had lower viscosity than *Hevea* compounds, and no significant effect of oil type on viscosity.
Figure 5:
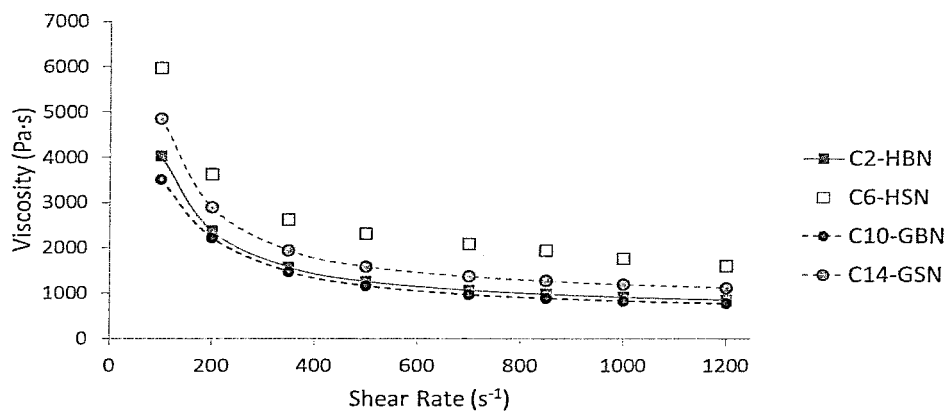
FIG. 5 graphically illustrates the effect of filler type on viscosity of apex compounds (60 phr R) wherein silica compounds had higher viscosities than black compounds, *Hevea* silica compounds had significantly higher viscosities than guayule compounds, and silica containing *Hevea* and guayule black compounds had similar viscosities.
Figure 6:
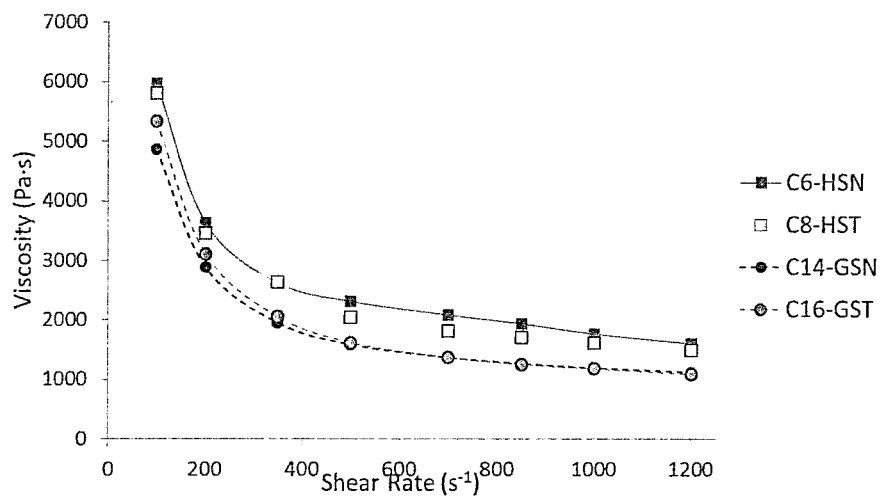
FIG. 6 graphically illustrates the effect of oil type on viscosity in silica apex compounds (60 phr R) demonstrating that *Hevea* silica had a higher viscosity than guayule silica.
Figure 7:
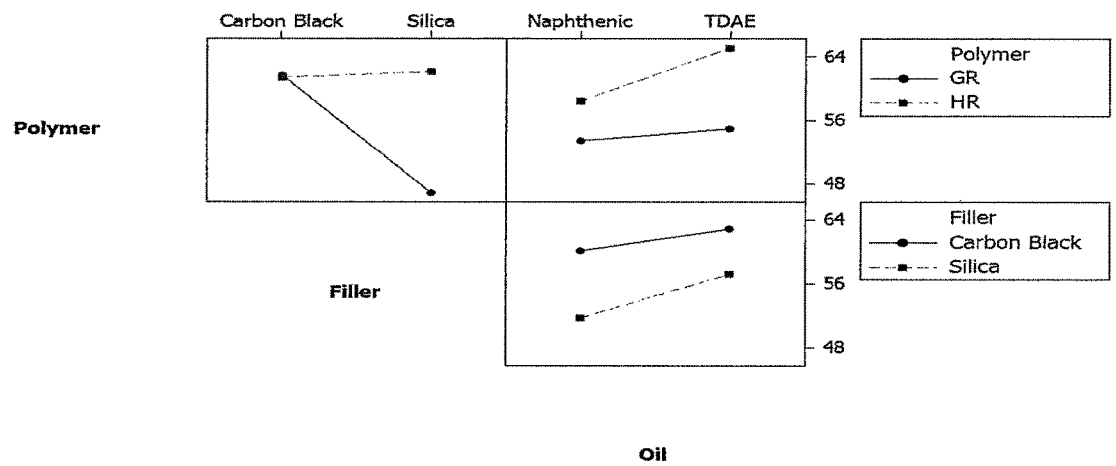
FIG. 7 plots interactions between polymer, filler, polymer-filler, and oil level on Mooney viscosity in tread compounds.
Figure 8:
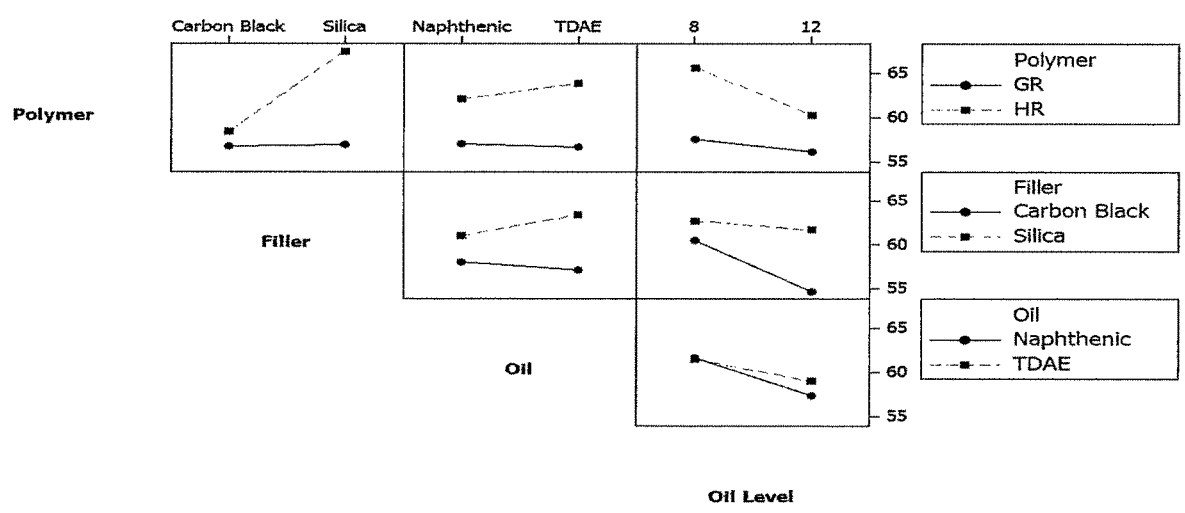
FIG. 8 plots interactions between polymer, filler, polymer-filler, and oil level on Mooney viscosity in apex compounds.
Figure 9:
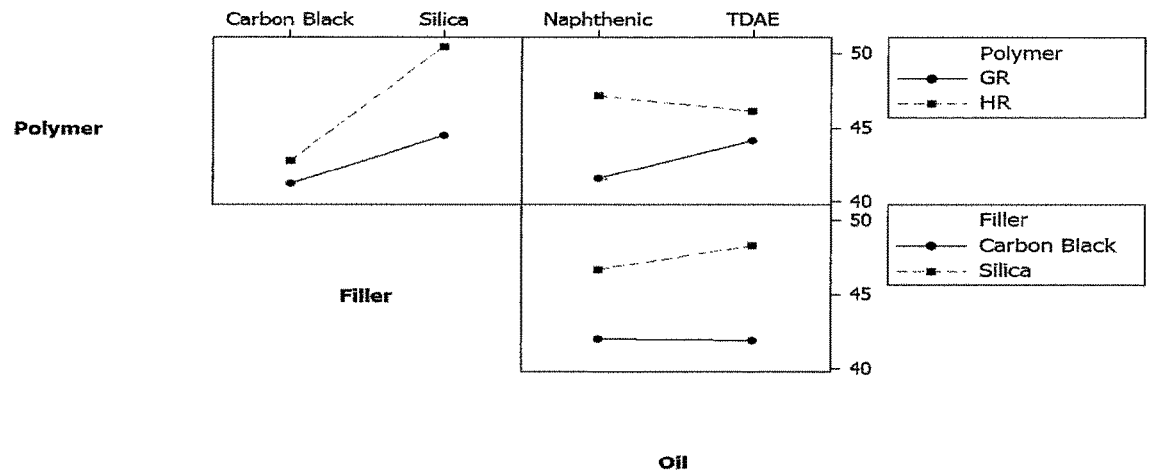
FIG. 9 plots interactions between polymer, filler, polymer-filler, and oil level on Mooney viscosity in sidewall compounds.
Figure 10:
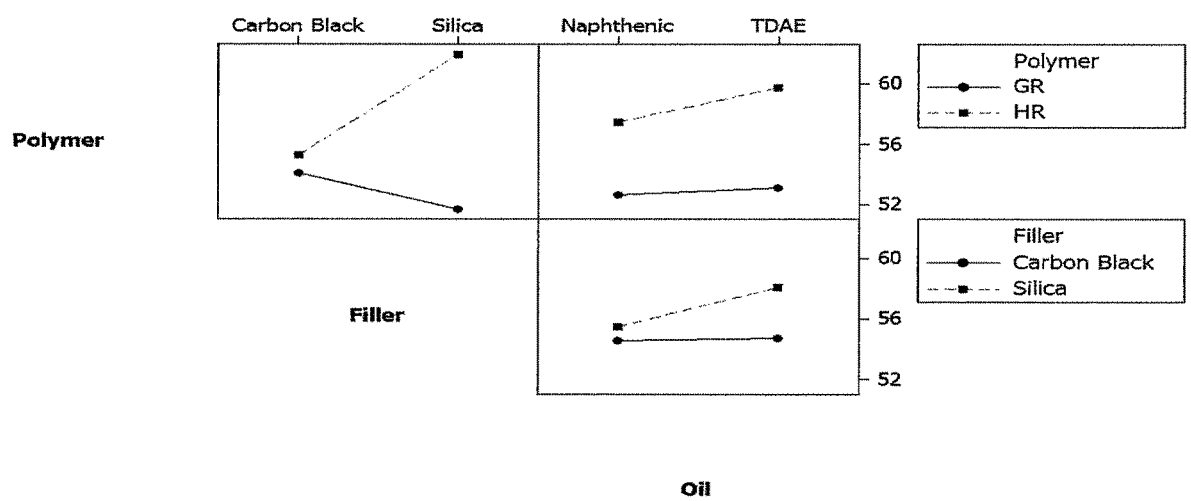
FIG. 10 plots interactions for all stocks combined on Mooney viscosity.

With reference to FIG. 1 there is shown a tire T having a crown 10 with external treads 12 and grooves 14. In cross-section the tire T has the crown 10 extending radially outwardly along an arcuate path to a pair of oppositely disposed sidewalls 16 which define the maximum radial extent of the tire T. The sidewalls 16 curve inwardly from such maximum radial extent to a narrower area terminating at a pair of oppositely disposed beads 18. The rubber compounds of this disclosure are suitable for use in construction of either or all of the tread, sidewalls, and beads of a tire.

In accordance with this invention, a tire including a rubber is provided wherein the rubber composition is comprised of: (A) natural non-*Hevea* cis-1,4-polyisoprene rubber; (B) from about 15 to about 90, alternately from about 20 to about 80, and alternately from about 25 to about 70 phr of particulate reinforcing fillers comprised of: (1) amorphous synthetic silica, such as precipitated silica, and, optionally (2) rubber reinforcing carbon black. The composition can further optically include (C) an emulsion polymerized styrene/butadiene or a solution polymerized styrene/butadiene rubber or polybutadiene rubber.

The styrene/butadiene copolymer and/or polybutadiene may be prepared, for example, using conventional aqueous emulsion copolymerization of styrene and/or 1,3-butadiene monomers in an aqueous medium in the presence of a catalyst system.

The silica can be hydrophobated. More specifically, the silica can have a material attached to its surface to enhance incorporation into the rubber. Hydrophobating materials, processes of hydrophobating, and processes of making a rubber masterbatch and rubber products are disclosed in U.S. Published Application 2006/0137575 A1 (in-situ) and U.S. Pat. No. 8,865,799 (ex-situ), the disclosures of which are herein incorporated by reference. Also incorporated herein by reference is "Optimization of Rubber Formulations for Silica-Reinforced Rubber Compounds", Rubber Chemistry and Technology, Vol. 86, No. 2, pp. 313-329 (2013) by W. Kaewsakul, K. Sahakaro, W. K. Dierkes, and J. W. M. Noordermeer.

The silica may be used in conjunction with a silica coupler to couple the silica to the elastomer(s), to thus enhance its effect as reinforcement for the elastomer composition. Use of silica couplers for such purpose are well known and typically have a moiety reactive with hydroxyl groups (e.g. silanol groups) on the silica and another moiety interactive with the elastomer(s) to create the silica-to-rubber coupling effect.

The coupling agent for said silica reinforcement may be, for example, (A) a bis-(3-trialkoxysilyalkyl) polysulfide such as, for example, a bis-(3-triethoxysilylpropyl) polysulfide, or (B) a bis-(3-triethoxysilylpropyl) polysulfide having an average of from about 2 to about 2.6 connecting sulfur atoms in its polysulfidic bridge or a bis-(3-triethoxysilylpropyl) polysulfide having an average of from about 3.4 to about 4 connecting sulfur atoms in its polysulfidic bridge, wherein said polysulfide having an average of from about 2 to about 2.6 connecting sulfur atoms in its polysulfidic bridge (to the exclusion of such polysulfide having an average of from about 3.4 to about 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or (C) an organoalkoxymercaptosilane. Representative examples of various organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

The coupling agent may, for example, be added directly to the elastomer mixture or may be added as a composite of precipitated silica and such coupling agent formed by treating a precipitated silica therewith or by treating a colloidal silica therewith and precipitating the resulting composite.

It is readily understood by those having skill in the art that the rubber compositions can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including C5-C9 resins, C5 resins, coumarone-indene resins, terpene resins and terpene-phenolic resins, the aforesaid silica, and other plasticizers, fillers, pigments, fatty acid, zinc oxide, microcrystalline waxes, antioxidants and antiozonants, peptizing agents and carbon black reinforcing filler. As known to those skilled in the art, depending on the intended use of the sulfur vulcanizable and sulfur-vulcanized material (rubbers), the additives mentioned above are selected and commonly used in conventional amounts.

The vulcanization can be conducted in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur Accelerators are used to control the time and/or temperature required for vulcanization and to improve the properties of the vulcanizate. In one embodiment, a single accelerator system may be used, i.e., primary accelerator. In another embodiment, combinations of two or more accelerators in which the primary accelerator is generally used in the larger amount, and a secondary accelerator which is generally used in smaller amounts in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. One description of a suitable rubber processing methodology is provided in GB 1,400,930, incorporated herein by reference.

In general, compounds with guayule rubber (GR) in place of *Hevea* rubber (HR) had similar processing results as found in the corresponding black compounds. Surprisingly however, in silica compounds, GR compounds had lower Mooney viscosity, complex torque, elastic torque and high tan δ. In capillary rheometry, GR compounds had similar viscosities to HR compounds with black and again surprisingly lower viscosities with silica. These results indicate that compounds with GR have better processability than their HR equivalents in silica compounds and similar processability in black compounds. GR compounds were generally less affected by changing the filler or oil type suggesting that the processability of GR compounds is less likely to be affected by compounding changes that HR compounds.

With silica as the filler, GR compounds had lower Mooney viscosity with naphthenic oil than those with NR and naphthenic oil in recipes A and B (see below). GR compounds with silica had lower S* and higher tanδ than those with HR and silica in recipe A with both oils and in recipe C with TDAE. With silica as the filler, GR compounds with both oil types had lower S' than equivalent HR compounds in recipe A. In recipe C, this was only observed with TDAE. These results indicate that in recipe A, changing the polymer from HR to GR decreases the viscosity and improves the processability of the rubber. In recipes B and C this is dependent on the oil type. In recipe B GR compounds with naphthenic oil and recipe C GR compounds with TDAE have better processability than their HR equivalents. In silica compounds, increasing naphthenic oil had a slight effect of decreasing Mooney viscosity, S*, and S' with HR and no effect with GR. Increasing the level of TDAE in silica compounds decreased Mooney viscosity S*, and S' and increased them with GR. This indicates that GR interacts with oils differently than HR and its processability is not necessarily improved by an increase in oil.

For purposes of this disclosure a compound with better processability is considered as having a lower Mooney viscosity. A reference to Mooney (ML 1+4) viscosity of an elastomer or sulfur vulcanizable polymer represents the viscosity of the respective elastomer or sulfur vulcanizable polymer in its uncured state. The Mooney (ML 1+4) viscosity at 100° C. uses a one minute warm up time and a four minute period of viscosity measurement, a procedural method well known to those having skill in such art. Processability of compounds will also be improved if the tan δ of the green compound is higher, or if the viscosity as a function of shear (as observed in a capillary rheometer plot) is lower.

A tire can be built, shaped, molded and cured from the presently disclosed composition by various methods which will be readily apparent to those having skill in such art.

The invention may be better understood by reference to the following example in which the parts and percentages are by weight unless otherwise indicated.

EXAMPLES

The elastomers used were SIR-20 for the *Hevea* rubber compounds and Guayule rubber isolated from latex and purchased from the Yulex Corporation. *Hevea* and Guayule compounds were made according to the formulas in recipes A (Tread), B (Sidewall) and C (Apex). Mooney viscosity was determined using ASTM D1649, and capillary rheometery data was obtained using ASTM D5099. All testing was performed at 100° C.

Recipe A—Tread

| Component (phr) | A1 | A2 | A3 | A4 | A5 | A6 | A7 | A8 |
|---|---|---|---|---|---|---|---|---|
| SIR-20 | 100 | 100 | 100 | 100 | — | — | — | — |
| GR | — | — | — | — | 100 | 100 | 100 | 100 |
| N234 | 50 | 50 | — | — | 50 | 50 | — | — |
| Ultrasil 7000 | — | — | 50 | 50 | — | — | 50 | 50 |
| TESPD | — | — | 4.3 | 4.3 | — | — | 4.3 | 4.3 |
| Naphthenic oil | 5 | — | 5 | — | 5 | — | 5 | — |
| TDAE | — | 5 | — | 5 | — | 5 | — | 5 |
| Stearic acid | 1 | 1 | 1 | 1 | 1 | 1 | 1 | 1 |
| Zinc oxide | 5 | 5 | 5 | 5 | 5 | 5 | 5 | 5 |
| TMQ | 2 | 2 | 2 | 2 | 2 | 2 | 2 | 2 |
| Sulfur | 1.4 | 1.4 | 1.4 | 1.4 | 1.4 | 1 | 1.4 | 1.4 |
| TBBS | 1 | 1 | 1 | 1 | 1 | 1 | 1 | 1 |

Recipe B—Sidewall

| Component (phr) | B1 | B2 | B3 | B4 | B5 | B6 | B7 | B8 |
|---|---|---|---|---|---|---|---|---|
| SIR-20 | 40 | 40 | 40 | 40 | — | — | — | — |
| GR | — | — | — | — | 40 | 40 | 40 | 40 |
| BR 1280 | 60 | 60 | 60 | 60 | 60 | 60 | 60 | 60 |
| N550 | 50 | 50 | — | — | 50 | 50 | — | — |
| Zeosil 1085 | — | — | 62 | 62 | — | — | 62 | 62 |
| TESPD | — | — | 5.3 | 5.3 | — | — | 5.3 | 5.3 |
| Naphthenic oil | 7 | — | 7 | — | 7 | — | 7 | — |
| TDAE | — | 7 | — | 7 | — | 7 | — | 7 |
| Stearic acid | 1.5 | 1.5 | 1.5 | 1.5 | 1.5 | 1.5 | 1.5 | 1.5 |
| Zinc oxide | 3 | 3 | 3 | 3 | 3 | 3 | 3 | 3 |
| TMQ | 1 | 1 | 1 | 1 | 1 | 1 | 1 | 1 |
| DAPD | 1 | 1 | 1 | 1 | 1 | 1 | 1 | 1 |
| 6-PPD | 3 | 3 | 3 | 3 | 3 | 3 | 3 | 3 |
| Sulfur | 1.5 | 1.5 | 1.5 | 1.5 | 1.5 | 1.5 | 1.5 | 1.5 |
| CBS | 1 | 1 | 2.3 | 2.3 | 1 | 1 | 2.3 | 2.3 |

Recipe C—Apex

| Component (phr) | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|
| SIR-20 | 60 | 60 | 60 | 60 | 60 | 60 | 60 | 60 | — | — | — | — | — | — | — | — |
| GR | — | — | — | — | — | — | — | — | 60 | 60 | 60 | 60 | 60 | 60 | 60 | 60 |
| SBR 1502 | 40 | 40 | 40 | 40 | 40 | 40 | 40 | 40 | 40 | 40 | 40 | 40 | 40 | 40 | 40 | 40 |
| N326 carbon black | 80 | 80 | 80 | 80 | — | — | — | — | 80 | 80 | 80 | 80 | — | — | — | — |
| Ultrasil 7000 | — | — | — | — | 80 | 80 | 80 | 80 | — | — | — | — | 80 | 80 | 80 | 80 |
| TESPD | — | — | — | — | 6.8 | 6.8 | 6.8 | 6.8 | — | — | — | — | 6.8 | 6.8 | 6.8 | 6.8 |
| Naphthenic oil | 8 | 12 | — | — | 8 | 12 | — | — | 8 | 12 | — | — | 8 | 12 | — | — |
| TDAE | — | — | 8 | 12 | — | — | 8 | 12 | — | — | 8 | 12 | — | — | 8 | 12 |
| Stearic acid | 2 | 2 | 2 | 2 | 2 | 2 | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 | 3 | 3 | 3 | 3 | 3 | 3 |
| TMQ | 2 | 2 | 2 | 2 | 2 | 2 | 2 | 2 | 2 | 2 | 2 | 2 | 2 | 2 | 2 | 2 |
| P-tert-octylphenol formaldehyde resin | 3 | 3 | 3 | 3 | 3 | 3 | 3 | 3 | 3 | 3 | 3 | 3 | 3 | 3 | 3 | 3 |
| Phenolic novalac resin | 8 | 8 | 8 | 8 | 8 | 8 | 8 | 8 | 8 | 8 | 8 | 8 | 8 | 8 | 8 | 8 |
| Hexamethylenetetramine | 0.8 | 0.8 | 0.8 | 0.8 | 0.8 | 0.8 | 0.8 | 0.8 | 1 | 0.8 | 0.8 | 0.8 | 0.8 | 0.8 | 0.8 | 0.8 |
| Sulfur | 1 | 1 | 1 | 1 | 1 | 1 | 1 | 1 | 1 | 1 | 1 | 1 | 1 | 1 | 1 | 1 |
| Insoluble polymeric sulfur | 6.3 | 6.3 | 6.3 | 6.3 | 6.3 | 6.3 | 6.3 | 6.3 | 6 | 6.3 | 6.3 | 6.3 | 6.3 | 6.3 | 6.3 | 6.3 |
| OBTS[a] | 2 | 2 | 2 | 2 | 2 | 2 | 2 | 2 | 2 | 2 | 2 | 2 | 2 | 2 | 2 | 2 |

[a]N-oxydiethylene-2-benzothiazole sulfenamide

Rubber compounds were mixed in a 300 cc Brabender mixer using the following mixing protocols.

Carbon Black Compounds

| Mixing Step | Mixing Time (min) |
|---|---|
| Master Pass | |
| Add polymer, ½ of black, and additives | 0:00 |
| Increase rotor speed to 40 rpm | 0:10 |
| Increase rotor speed to 60 rpm | 0:20 |
| Add ½ of remaining black | 1:00 |
| Increase rotor speed to 80 rpm | 1:15 |
| Add oil | 2:30 |
| Ram sweep | 4:00 |
| Drop batch | 5:00 |
| Final Pass | |
| Add master pass and curatives | 0:00 |
| Increase rotor speed to 40 rpm | 0:30 |
| Ram sweep | 1:30 |
| Drop batch | 2:30 |

Silica Compounds

| Mixing Step | Mixing Time (min) |
|---|---|
| Master Pass | |
| Add polymer, ½ of silica, and additives | 0:00 |
| Increase rotor speed to 40 rpm | 0:10 |
| Increase rotor speed to 60 rpm | 0:20 |
| Add ½ of remaining silica | 1:00 |
| Increase rotor speed to 80 rpm | 1:15 |
| Add oil | 2:30 |
| Ram sweep | 3:30 |
| Maintain temperature at 160-170° C. | 4:30 |
| Drop batch | 8:30 |
| Final Pass | |
| Add master pass and curatives | 0:00 |
| Increase rotor speed to 40 rpm | 0:30 |
| Ram sweep | 1:30 |
| Drop batch | 2:30 |

Compound Nomenclature for Capillary Rheometry

| Component | Hevea (H) | Guayule (G) |
|---|---|---|
| Polymer | Hevea (H) | Guayule (G) |
| Filler | Carbon black (B) | Silica (S) |
| Oil | Naphthenic (N) | TDAE (T) |

In general, compounds with GR in place of HR had similar results in black compounds. In silica compounds, GR had lower Mooney viscosity, complex torque, elastic torque and higher tang. In capillary rhemoetry, GR compounds had similar viscosities to HR compounds with black and lower viscosities with silica. These results indicate that compounds with GR have better processability than HR equivalents in silica compounds and similar processability in black compounds. GR compounds were generally less affected by changing the filler or oil type suggesting that the processability of GR compounds is less likely to be affected by compounding changes than HR compounds. In short, silica compounds with GR have better processing characteristics than equivalent compounds with HR.

This written description uses examples to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

The invention claimed is:

1. A rubber composition comprising guayule rubber, 15 to 90 phr silica, at least one of an oil and a resin, and a synthetic rubber, said silica including a silane coupling agent.

2. The rubber composition of claim 1 wherein the silane coupling agent is selected from the group including bis (triethoxysilypropyl)tetrasulfide (TESPT), bis(triethoxysilypropyl-y)disulfide (TESPD), 3-mercaptopropyl trimethoxy silane (A-189), and 3-mercaptopropyl triethoxy silane (A-1891).

3. The rubber composition of claim 1 wherein the silica is pretreated with the silane coupling agent prior to mixing with the rubber.

4. A rubber composition of claim 1 wherein the surface area of the silica is between 175 and 90 m²/gm.

5. The rubber composition of claim 1 comprising between about 40-100 phr of guayule rubber.

6. The rubber composition of claim 1 including carbon black at a lesser amount than said silica.

7. The rubber composition of claim 1 including about 20 to 80 phr silica.

8. The rubber composition of claim 1 comprising between 50-80 phr silica.

9. Finished rubber articles containing the rubber composition of claim 1.

10. A tire containing the rubber composition of claim 1.

11. A tread component of a tire containing the rubber composition of claim 1.

12. A tread component of a truck tire containing the rubber composition of claim 1.

13. A tread component of an aircraft tire containing the rubber composition of claim 1.

14. The composition of claim 1 wherein the guayule rubber is non-functionalized.

* * * * *